Sept. 3, 1957   J. B. EISEN   2,805,274
BATTERY ELECTRODE COMPONENT
Filed July 16, 1953
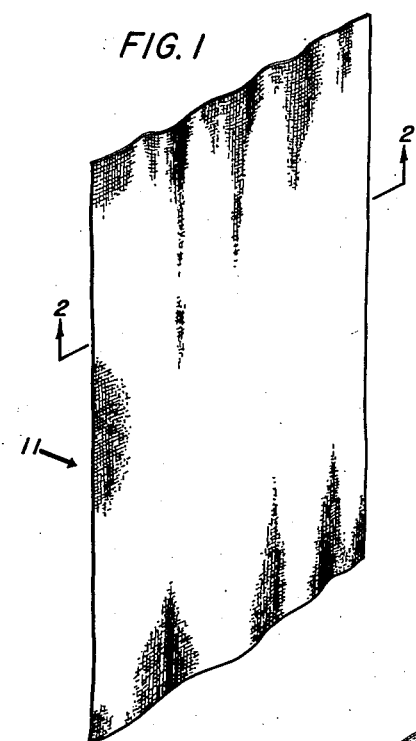
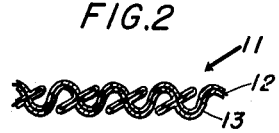
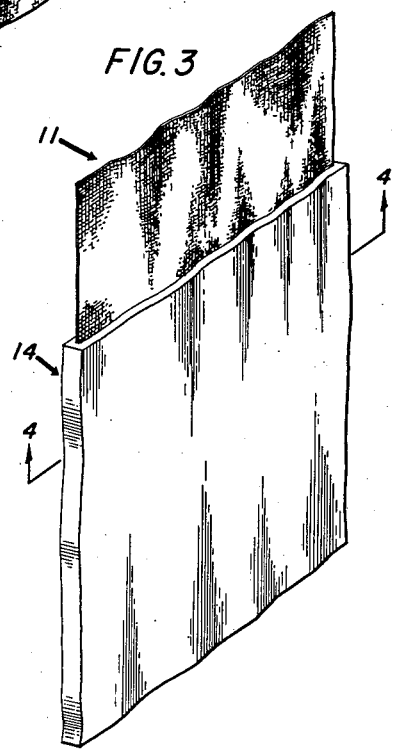
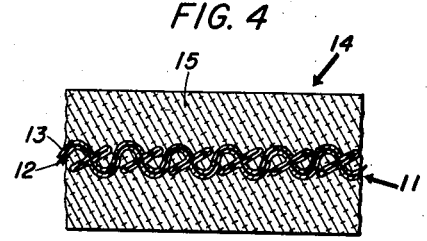
INVENTOR.
JOHN B. EISEN
BY
Attorney 2,805,274
Patented Sept. 3, 1957

2,805,274
BATTERY ELECTRODE COMPONENT

John B. Eisen, Waterloo, Wis., assignor to Bjorksten Research Laboratories, Inc., Madison, Wis., a corporation of Illinois Application July 16, 1953, Serial No. 368,300

9 Claims. (Cl. 136—120)

This invention relates to electrodes for electric cells and batteries and more particularly to thin flexible conductive sheet material adapted to serve as a base for an electrode formed by adhering a composition comprising electrochemically active particles to such material.

It has been known heretofore to provide electrodes by adhering or "pasting" a composition comprising particles of electrochemically active material such as particles of lead or zinc or PbO, AgO, $Ag_2O$, $V_2O_5$, $MnO_2$ or the like to such materials as copper wire gauze, nickel wire gauze, perforated zinc plates and the like. This invention relates most particularly to a substance which may be utilized in place of such wire gauze and which has the advantage of being much lighter than wire gauze and yet extremely conductive. The light weight of such material is of immense advantage in aircraft batteries assembled with electrodes in which such material is utilized.

It is therefore an object of the invention to provide an electrode comprising particles of electrochemically active material adhered to a thin flexible conductive backing sheet of light weight and novel form.

Another object is a thin flexible conductive backing sheet in an electrode, adapted to serve as a base for electrochemically active chemicals adhered thereto.

Further objects will become apparent from the drawings and the following detailed description in which it is my intention to illustrate the invention without thereby limiting its scope to less than that of all equivalents and in which like numerals refer to like parts and in which:

Figure 1 is a perspective view of the backing sheet material of the invention;

Figure 2 is a cross-sectional view of the material of Figure 1 taken on lines 2—2;

Figure 3 is a perspective view of an electrode assembled utilizing the material of the invention;

Figure 4 is a perspective view of the electrode of Figure 3 taken along lines 4—4.

Referring now to Figures 1 and 2, the flexible backing sheet material indicated generally as 11, comprises cloth or fabric 12 coated with metal 13.

As shown in Figures 3 and 4 an electrode indicated generally as 14 may be provided by applying a suitable paste of particles of electrochemically active material and adhesive or binder 15 to a sheet 11 of the backing material according to the invention.

The following examples will serve further to illustrate the invention:

Example 1

A sheet 3 ft. by 3 ft. of 106 glass cloth was sprayed with a "paint" composition consisting of:

very fine particles of silver
cellulosic ester paint vehicle comprising one or more of the following:
    cellulose acetate
    cellulose nitrate
    cellulose acetate butyrate
    cellulose acetate propionate
    cellulose acetatae stearate suitable solvent such as butyl acetate or ethyleneglycolmonomethylether acetate or both.

A successful composition is that which is sold commercially by duPont de Nemours as "4922," advertized as being suitable for use on wood, paper and plastics. The exact composition of the "paint" composition is generally not critical, it being sufficient that the composition have the desired viscosity.

The "paint" may be applied by dipping, roller coating or any other suitable method instead of spraying.

The solvent was evaporated and the sheet was ignited by touching the flame of a torch to one corner. A match usually serves equally well. A wave of flame then traveled across the surface of the sheet in less than a second.

It is believed that the ignition consists of a rapid burning oxidation (or "burn off") of the paint vehicle. The result of such ignition is that the silver is slightly melted and is caused to adhere extremely tenaciously to the glass surface, probably by partial diffusion or penetration into the surface and that the strength characteristics of the fibers in the glass fabric are not affected.

The resultant article is a strong flexible conductive woven fabric.

A paste or slurry comprising particles of AgO suspended in an adhesive composition such as that described in co-pending application Serial No. 365,977, filed July 3, 1953, now Patent 2,708,683, was then applied to the resultant sheet and dried to provide a battery electrode.

Other applications and patents relating to the subject matter hereof are: Pat. 2,688,649, Pat. 2,679,546, SN 271,931 filed 2–16–52 (Abandoned), SN 310,778 filed 9–22–52, Pat. 2,708,683, and SN 539,963 filed 10–12–55.

Example 2

Pieces of 181 glass cloth, 12 inches by 12 inches in size, were dipped in solutions of ammoniacal silver nitrate containing reducing agents such as Fehling's solution or formaldehyde such as are generally utilized to provide silver mirror finishes. The pieces of cloth were removed from the solutions and washed and dried. They were found to have fine silver deposits on the surfaces of the glass fibers. In some cases these were relatively shiny whereas in others they were black. In order to provide an adherent coating of the silver to the glass, the pieces of the cloth were fired in a furnace for from .1 second to 3 seconds. Preferably the time of firing is less than 1 second. The temperature of the furnace may be from about 100° below the melting point of silver to about 200° or 300° above the melting point of silver but is not critical since a silver coating is provided on the glass prior to conducting the firing step.

Pieces of cloth coated in this manner were utilized in constructing battery electrodes by applying thereto a paste or slurry comprising an adhesive and electrochemically active particles suspended therein as disclosed in the aforementioned co-pending application, for example a suitable such composition may consist of 100 parts $Ag_2O$, 50 parts water, .25 part methyl cellulose and .4 part potassium sulfate.

Although the examples have shown the use of only two coating methods, any coating method may be used to provide the electrode of this invention.

It has been found that the igniting step of Example 1 is critical. Other methods of fusing silver to the surface of the cloth have been found unsatisfactory; these include:

inserting the fabric in a heated furnace
passing the flame of a torch over the surface of the fabric
laying the fabric on a heated surface.

Any prolonged exposure to high temperature results in extreme weakening of the glass in the extremely delicate 106 glass fabric.

Although the examples have disclosed the use of only silver, it is clear that other metals may suitably be utilized such as for example copper, aluminum, zinc and the like.

Although the examples have described the application of the invention only to fabric comprising glass, the invention may be applicable to other non-conductive or insulating fabrics such as fabrics made of nylon, polyester synthetic resin (sold commercially as Dacron or Terylene) fabrics of polyacrylonitrile synthetic resin (sold commercially as Orlon), rayon fabrics and possibly even cotton fabrics. Glass is generally preferable.

A cellulose ether may in some instances be incorporated in the "paint" composition to serve together with or in place of one or more of the esters as a vehicle.

It has been found that an amount of AgO on the order of from 2 to 10% of the amount of Ag in the "paint" composition may be added together with the Ag in the composition and that suitable coatings will be provided. The AgO is reduced during the ignition step. During said step it is believed to furnish oxygen internally and thus contribute to the oxidation of the vehicle. A larger proportion of AgO or $Ag_2O$ may also be used or AgO or $Ag_2O$ may be used to the exclusion of Ag but generally less suitable results are obtained.

It may thus be seen that the invention broadly relates to providing a flexible conductive backing sheet as a base material for an electrode wherein said material comprises a fabric of insulating material coated with a film of conducting metal.

The invention also relates to an electrode consisting of such a material having particles of an electrochemically active material adhered thereto and to each other with any suitable binder composition.

Thus it may be seen that my invention is broad in scope and is not to be limited excepting by the claims.

Having thus disclosed my invention, I claim:

1. The process of making a flexible conductive backing sheet for an electrode comprising coating a sheet of fabric selected from the group consisting of glass, nylon, polyester synthetic resin, acrylonitrile polymers, rayon and cotton with a paint composition comprising a vehicle of combustible polymer and particles of a metal selected from the group consisting of silver, copper, zinc and aluminum and alloys containing major proportions thereof and then initiating quickly the combustion of said vehicle and burning off said vehicle without prolonged heating.

2. The process of making a flexible conductive backing sheet for an electrode comprising coating a sheet of fabric of glass with a paint composition comprising a vehicle of combustible polymer and particles of a metal selected from the group consisting of silver, copper, zinc and aluminum and alloys containing major proportions thereof and then initiating quickly the combustion of said vehicle and burning off said vehicle without prolonged heating.

3. The process of making a flexible conductive backing sheet for an electrode comprising coating a sheet of fabric of acrylonitrile polymer with a paint composition comprising a vehicle of combustible polymer and particles of a metal selected from the group consisting of silver, copper, zinc and aluminum and alloys containing major proportions thereof and then initiating quickly the combustion of said vehicle and burning off said vehicle without prolonged heating.

4. The process of making a flexible conductive backing sheet for an electrode comprising coating a sheet of fabric of nylon with a paint composition comprising a vehicle of combustible polymer and particles of a metal selected from the group consisting of silver, copper, zinc and aluminum and alloys containing major proportions thereof and then initiating quickly the combustion of said vehicle and burning off said vehicle without prolonged heating.

5. The process of making a flexible conductive backing sheet for an electrode comprising coating a sheet of fabric selected from the group consisting of glass, nylon, polyester synthetic resin, acrylonitrile polymers, rayon and cotton with a paint composition comprising a vehicle of combustible polymer and particles consisting essentially of silver and then initiating quickly the combustion of said vehicle and burning off said vehicle without prolonged heating.

6. The process of making a flexible conductive backing sheet for an electrode comprising coating a sheet of fabric selected from the group consisting of glass, nylon, polyester synthetic resin, acrylonitrile, polymers, rayon and cotton with a paint composition comprising a vehicle of combustible polymer and particles consisting essentially of copper and then initiating quickly the combustion of said vehicle and burning off said vehicle without prolonged heating.

7. The process of making a flexible conductive backing sheet for an electrode comprising coating a sheet of fabric selected from the group consisting of glass, nylon, polyester synthetic resin, acrylonitrile polymers, rayon and cotton with a paint composition comprising a vehicle of combustible polymer and particles consisting essentially of zinc and then initiating quickly the combustion of said vehicle and burning off said vehicle without prolonged heating.

8. The process of making a flexible conductive backing sheet for an electrode comprising coating a sheet of fabric of glass with a paint composition comprising a vehicle of combustible polymer and particles of a metal consisting essentially of silver and then initiating quickly the combustion of said vehicle and burning off said vehicle without prolonged heating.

9. The process of making a flexible conductive backing sheet for an electrode comprising coating a sheet of fabric of glass with a paint composition comprising a vehicle of combustible polymer and particles of a metal consisting essentially of zinc and then initiating quickly the combustion of said vehicle and burning off said vehicle without prolonged heating.

References Cited in the file of this patent

UNITED STATES PATENTS

| | | |
|---|---|---|
| 1,321,947 | Sperry | Nov. 18, 1919 |
| 1,662,866 | Salazar | Mar. 20, 1928 |
| 2,626,294 | Brennan | Jan. 20, 1953 |
| 2,627,531 | Vogt | Feb. 3, 1953 |
| 2,708,683 | Eisen | May 17, 1955 |